Dec. 15, 1959 L. R. TRAVIS ET AL 2,917,735

TELEVISION RECEIVER

Filed Dec. 22, 1955 4 Sheets-Sheet 1

Dec. 15, 1959 L. R. TRAVIS ET AL 2,917,735

TELEVISION RECEIVER

Filed Dec. 22, 1955 4 Sheets-Sheet 3

United States Patent Office 2,917,735
Patented Dec. 15, 1959

2,917,735

TELEVISION RECEIVER

Lawrence R. Travis, Fanwood, N.J., Paul Heller, Richmond Hill, N.Y., and William R. Petrick, Kenilworth, N.J., assignors to Westinghouse Electric Corporation, East Pittsburgh, Pa., a corporation of Pennsylvania Application December 22, 1955, Serial No. 554,888

1 Claim. (Cl. 340—367)

This invention relates to improvements in television receivers, and more particularly relates to a television receiver which consists in combination, constructions and arrangement of components thereof so that the receiver can be very rapidly and economically manufactured in quantity.

This invention provides a television receiver construction which comprises three primary structural members. These members are the chassis proper, the picture tube assembly and a pair of brace members. In their assembled form, the structural members form a triangular assembly which is extremely rigid. The television picture tube is supported only at the forward section of the envelope, adjacent to the face plate of the picture tube. The pair of brace members, in addition to providing one side of the triangular assembly, may accomplish a multiplicity of other functions. For example, the brace members are used for mounting the tuner associated with the receiver, for mounting printed conductor boards which carry various circuit components, as a support for suspending wires, and as a mounting for the control panel of the receiver which is designed with the receiver controls located at the top-front of the receiver cabinet. The position in space of the brace members makes the positioning of the tuner and its controls very flexible, that is, the tuner controls may be located at the top, sides or front of the chassis of the receiver making use of very simple bracketry.

In providing a triangular assembly for the receiver chassis, this invention makes possible several substantial economic savings in the manufacture of television receivers. A support for the rear or neck portion of the picture tube is not necessary, and the deflection yoke or other beam controlling apparatus is supported on the neck of the picture tube independent of any external bracketry. Thus, a substantial saving is introduced by the elimination of metal parts customarily used in the prior art to support the yoke or other beam controlling apparatus at the rear of the picture tube. In addition, since the picture tube assembly comprises one of the structural members of the triangular assembly, the chassis is considerably simplified inasmuch as the front of the chassis need only comprise a pair of spaced members upon which the picture tube is rested. The shelf which is customarily used in the prior art and which extends the entire width of the chassis is dispensed with utilizing the present invention.

It is therefore an object of this invention to provide an improved television receiver of extremely rigid construction comprising a minimum of structural members.

It is another object to provide a television receiver having three primary structural members assembled in such a manner to form a substantially triangular assembly.

It is another object to provide a television receiver in which one of said primary structural members comprises the television picture tube.

It is another object to provide a television receiver in which the chassis and the television picture tube form two of said primary structural members while brace members interconnecting said chassis and the front holding means of the television picture tube form the other primary structural member.

It is another object to provide a chassis for a television receiver which is constructed of a minimum number of metal parts easily attachable to each other by screwing, bolting, welding or the like.

It is another object to provide a chassis for a television receiver in which a pair of spaced front members is utilized to support the television picture tube.

It is another object to provide a television receiver in which the television picture tube is substantially directly mounted on the chassis thereof.

It is another object to provide a television receiver in which the television picture tube is rigidly mounted on a chassis which is less costly than those presently in use.

It is another object to provide a television receiver in which the forward edge of the picture tube is rigidly supported on a pair of spaced front members of the chassis, thus eliminating the necessity of providing a front member for said chassis or a shelf for said picture tube extending the width of said chassis.

It is another object to provide a television receiver in which the brace members are utilized to mount the receiver controls, tuner, printed conductor boards, and other circuit elements of said receiver.

These and other objects are effected by our invention as will be apparent from the following description taken in accordance with the accompanying drawings throughout which like reference characters indicate like parts, and in which.

Figure 1:
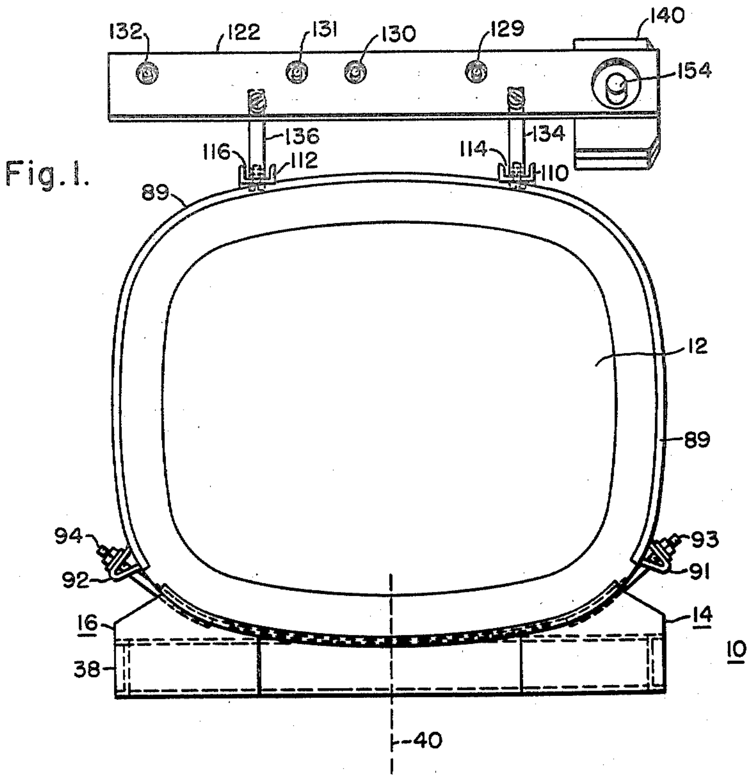
Figure 1 is a front elevational view of a television receiver embodying certain features of the invention.
Figure 3:
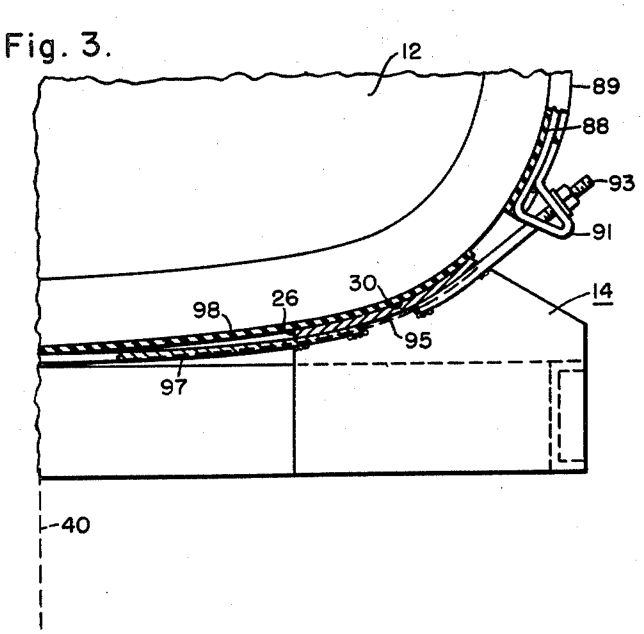
Fig. 3 is an enlarged fragmentary sectional view showing in detail the manner in which the television picture tube is supported on the chassis of the receiver shown in Fig. 1.

Referring to the drawings there is shown a television receiver construction comprising a chassis or base 10 on which is mounted a television picture tube 12. In accordance with our invention, the chassis 10 comprises a pair of spaced front members 14 and 16, which are substantially in alignment with each other and which serve as support structures for the picture tube 12; side members 18 and 20; and a rear member 22.

Figure 2:
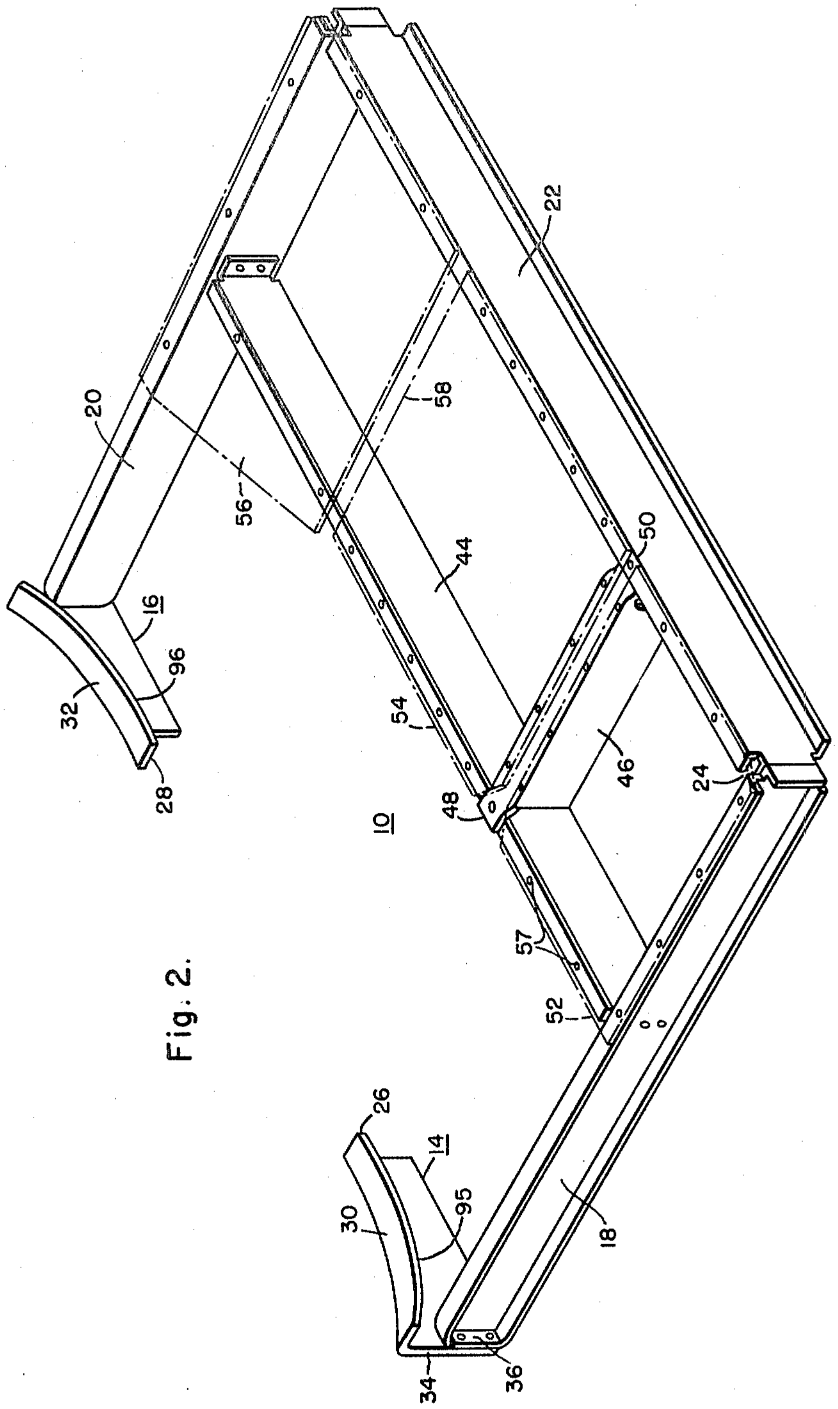
Fig. 2 is an enlarged perspective view of the chassis of Fig. 1 in which is shown the manner in which printed conductor boards are mounted on the chassis.

Referring in detail to Fig. 2, the rear member 22 consists of a Z-shaped metal piece while the side members 18 and 20 consist of metal pieces of a channel bar configuration, that is, the side members are shaped like an I-beam without flanges on their inner sides. The side member 18 is bolted to an inwardly extending flap 24 at one end of the rear member 22, while the side member 20 is bolted to a similar flap (not shown) at the other end of the rear member. Each of the front members 14 and 16 is a metal piece of the general shape shown in Fig. 2. Each is provided with inwardly extending flange portions 26 and 28 which have contact surfaces 30 and 32 respectively shaped to conform with the forward edge of the picture tube 12. The front member 14 has one side 34 which is bolted to an outwardly extending flap 36 at one end of the side member 18, while the front member 16 has one side 38 which is bolted to a similar flap (not shown) at one end of the side member 16.

It will be understood that the side members 18 and 20 and the rear member 22 may comprise a single frame member of a form so as to define an open-sided configuration with the ends of the frame member being connected to said spaced front members 14 and 16, respectively, without departing from the teachings of our invention.

As will be obvious from Figs. 1 and 2 of the drawings, the front members 14 and 16 are symmetrical with respect to the vertical axis 40 of the chassis 10, that is, these members are made in right and left-hand versions.

Still referring to Fig. 2 in detail, the chassis 10 is provided with inner members 44 and 46 for mounting various circuit elements of the receiver as well as providing bracing in order to render the structure of the chassis 10 extremely rigid. The inner member 44 consists of a Z-shaped metal piece which extends across the horizontal axis of the chassis and is bolted to the side members 18 and 20, respectively, so that it is held in a position substantially parallel to the rear member 22. The inner member 46 consists of an L-shaped metal piece having lip portions 48 and 50 extending from each end which are utilized to bolt the ends of this member to the inner member 44 and the rear member 22 so as to hold it in a position substantially parallel to the side member 18.

Printed conductor boards 52 and 54 and a metal plate 56, all shown in outline form, are provided with spaced apertures, such as at 57, for mounting them on the chassis members 18, 22, 44 and 46. These chassis members have similarly spaced apertures (not shown) in their top surfaces. The smaller printed conductor board 52 is mounted on the chassis members 18, 22, 44 and 46 while the larger printed conductor board 54 is mounted on the chassis members 22, 44 and 46. Alternately, one side 58 of the printed conductor board 54 may be mounted on the metal plate 56 or another inner member similar to the inner member 46 may be provided for this purpose. Metal clips or mounts indicated at 59 in Fig. 6, and which are easily and quickly pushed into the apertures in the boards 52 and 54 and the chassis members, are used to hold the boards in place. The printed conductor boards, which comprise insulating bases upon which electric conductors are formed, are free to flex with slight movement of the chassis 10. This floating arrangement of the boards 52 and 54 prevents cracking and breaking of the base material when the chassis is moved from one place to another. The metal plate 56 is bolted to the chassis members 20, 22 and 44.

Figure 6:
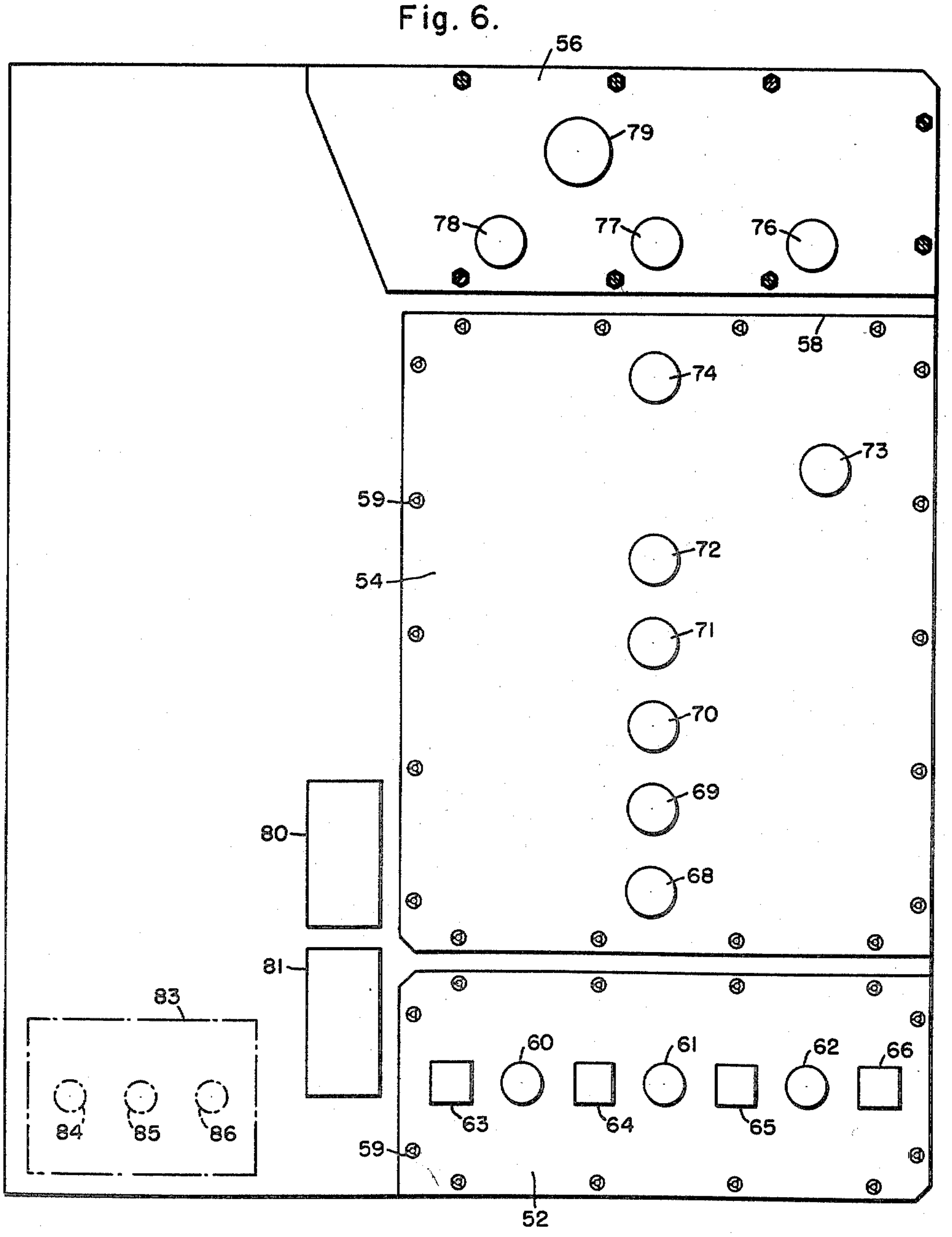
Fig. 6 represents a schematic layout in which the projected disposition of certain printed conductor boards and circuit elements on the top surface of the chassis of Fig. 1 is diagrammatically indicated.

Referring to Fig. 6, on the printed conductor board 52 there are arranged intermediate frequency amplifier tubes at 60, 61 and 62; transformers at 63, 64 and 65; and a crystal detector at 66. On the printed conductor board 54 there are arranged a video output tube at 68, a frequency modulation detector at 69, a sync separator tube at 70, a vertical discharge and keyed automatic gain control tube at 71, a vertical output tube at 72, a horizontal automatic frequency control tube at 73, and a horizontal multivibrator at 74. On the metal plate 56 there are arranged a horizontal output tube at 76, a damper tube at 77, an audio output tube at 78 and a high voltage rectifier at 79. A pair of selenium rectifiers are arranged at 80 and 81 in front of the boards 52 and 54 and may be attached (not shown) to the inner chassis member 44. There is also shown in outline form a tuner 83 which has mounted on it an ultra high frequency oscillator tube at 84, a radio frequency amplifier tube at 85 and a mixer-oscillator tube at 86. The tuner 83 is mounted on the receiver at a location which will hereafter be described in detail.

Referring to Figs. 1, 3, 4 and 5, the picture tube 12 is supported on its lower front edge on the front members 14 and 16 and is held in position by means comprising a metal strap 88, which is passed over the forward edge of the tube. A flexible strip 89 is disposed between the strap 88 and the tube 12. The strip 89 serves to protect the picture tube from sharp metal edges of the strap 88 as well as increasing the coefficient of friction between the metal strap 88 and the picture tube. The strip 89 is channeled to receive the strap 88 which is seated in the channel. The ends of the strap 88 are formed into bracket portions 91 and 92 which have central apertures therein. Spade bolts 93 and 94 are permanently fastened to the bottom surfaces 95 and 96, respectively, of the flange portions 26 and 28 of the front members 14 and 16. The bolts 93 and 94 are passed through the apertures in the bracket members 91 and 92 and nuts provided on these bolts are tightened until the picture tube is firmly held in place. Another flexible strap 97 is permanently fastened at its ends to the bottom surfaces 95 and 96 of the flange portions 26 and 28. Another flexible strip 98, similar to strip 89, is disposed between the tube 12 and the contact surfaces 30 and 32 of the flange portions 26 and 28 as well as the strap 97. The strap 97 may also be fastened at its ends to bottom portions of the front members 14 and 16. In that event, the strap 97 would be straight and not follow the tube 12 contour; similarly, the strip 98 would no longer be necessary as protection from strap 97, and would be replaced by two short strips between the tube 12 and the flange portions 26 and 28.

The bolt 93 is fastened to the front member 14 so that it is adjacent to the forward edge of the tube 12, and it extends upward at an acute angle to the vertical axis 40 of the chassis 10. The bolt 94 is similarly fastened to the front member 16. When the picture tube 12 is firmly held in place on the front members 14 and 16, the forces exerted by the picture tube on the front members will be in a direction parallel to the vertical axis 40 of the chassis while the forces exerted by the strap 88 on the front members 14 and 16, respectively, will be at the angle that the bolts 93 and 94 make relative to the vertical axis of the chassis. The resultant of the forces exerted on the front member 16 also extends outward from the vertical axis 40 of the chassis in a direction opposite to that of the former resultant. The strap 97 which interconnects the front members 14 and 16 operates to neutralize the opposite resultant forces. The strap 97 is in tension only and is thereby able to be flexible and very thin. The resulting material economy in the manufacture of a television receiver chassis is readily apparent.

It will also be apparent that the strap 97 may be omitted from the chassis of our invention as the neutralization of the opposite resultant forces on the front members 14 and 16 may be affected by reason of the fact that the rear member 22 of the chassis is bolted to the side members 18 and 20, thus preventing any outward or perpendicular movement of the front members relative to the vertical axis 40 of the chassis. The inner chassis member 44 also assists in preventing this outward movement.

A pair of spaced brace members or channel supports 110 and 112 is utilized to provide an extremely rigid television receiver structure. Each of the brace members 110 and 112 has one end which is fastened at the top of the picture tube 12 to the strap 88 while the other end is fastened to the back side of the rear member 22. The brace members 110 and 112 provide additional support for the picture tube at its forward end. The junction points 114 and 116 between the strap 88 and the brace members 110 and 112, respectively, may be slotted (not shown) to permit tilting of the picture tube in order to meet the picture tube mask (not shown) with a minimum of assembly effort. After the screws and lock washers, such as shown at 118 and 120, are tightened, the assembly is extremely rigid.

A control panel 122 has a rear side 123 on which control elements for the receiver may be mounted, such as shown at 124 through 127. At 124 may be located the on-off, volume and contrast controls; at 125, the horizontal hold control; at 126, the vertical hold control; and at 127, the brightness control. These controls are provided with shafts 129 through 132 which extend through apertures in the control panel. The control panel is mounted adjacent the top forward part of the tube 12 on a pair of spaced flexible straps 134 and 136. One end of the strap 134 is fastened to the rear side 123 of the control panel while the other end is fastened to the brace member 110. The strap 136 also has one end fastened to the rear side of the control panel with the other end fastened to the brace member 112. A tuner 140, upon which oscillator tube 142, amplifier tube 143 and mixer-oscillator tube 144 are attached, is supported on bracketry 146 which is in turn supported on the brace member 110. The bracketry 146 consists of a metal piece 148 which is fastened to the tuner 140 and a metal piece 150 which is fastened to the brace member 110. The metal pieces 148 and 150 have end portions which have adjusting slots therein to accommodate bolts, such as at 152, which are utilized to connect the two pieces together. The tuner 140 has a control shaft 154 provided with a positioning ring (not shown) which is mounted on a groove provided on the shaft. The control element shafts 129 through 132 extend through apertures in the control panel 122 substantially the same distance. The positioning ring provided on the control shaft 154 has a diameter larger than the diameter of the aperture in the control panel through which the control shaft 154 extends. This aperture serves also as a bearing for the shaft. The positioning ring is located on the tuner control shaft 154 at a position which allows the shaft to project through the aperture substantially the same distance as the control element shafts 129 through 132 extend through the other apertures in the control panel 122.

The problem of bringing the control shafts, such as control element shafts 129 through 132 and tuner control shaft 154, of a television set concentric with the clearance holes of a cabinet escutcheon is eliminated by the flexible mounting of the control panel. The control panel can easily be located to each individual cabinet so that the control shaft centers and shaft extensions are easily controlled. In addition, the proper location of the tuner is accomplished in final assembly after the position of the control panel with respect to the cabinet has been fixed due to the slot arrangements in the bracketry for mounting the tuner and to the positioning wing on the tuner control shaft which governs the distance the tuner shaft projects through the control panel.

Figure 4:
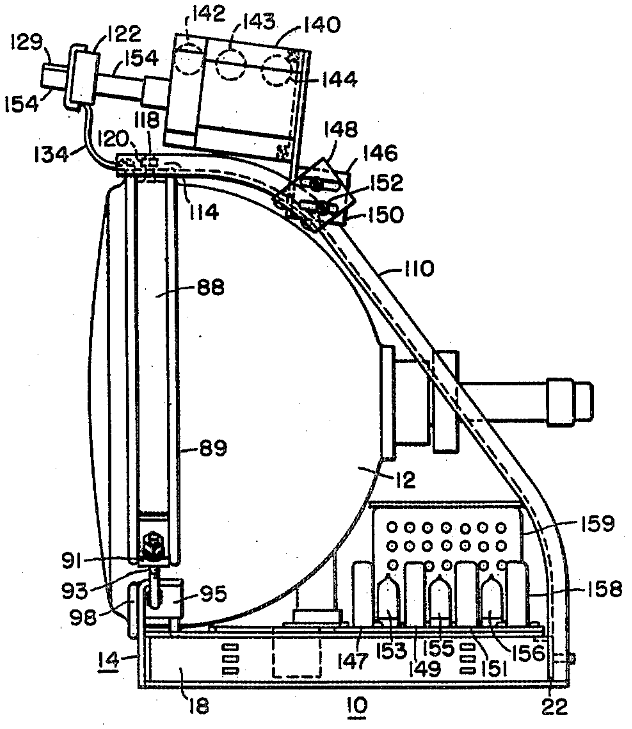
Fig. 4 is a side elevational view of the receiver of Fig. 1.

In Fig. 4 there are shown transformers 147, 149 and 151, intermediate frequency amplifier tubes 153, 155 and 156 and a crystal detector 158. These components are mounted on the printed conductor board 52. A shield 159 is provided for the high voltage rectifier which is mounted on the metal plate 56.

Figure 5:
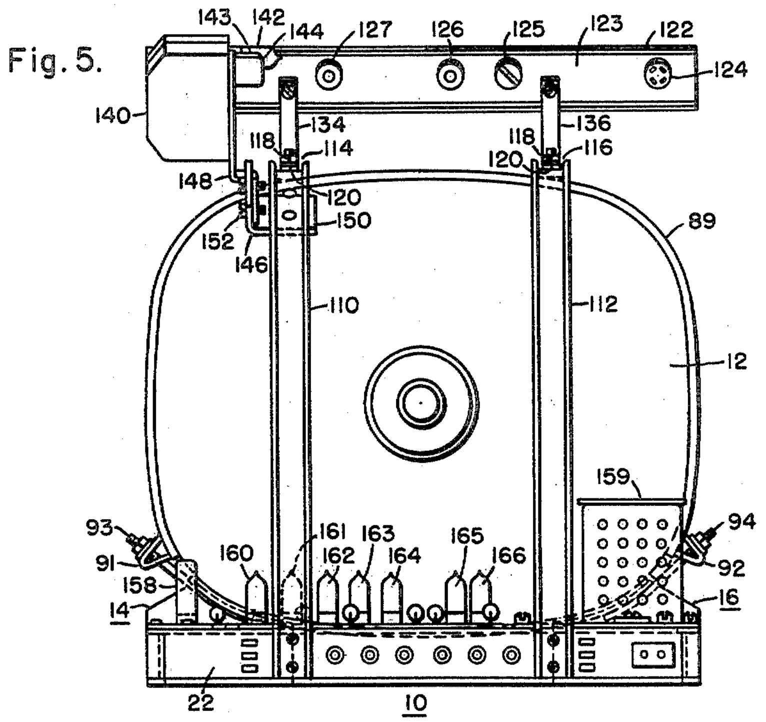
Fig. 5 is a rear elevational view of the receiver of Fig. 1.

In Fig. 5 there is shown a video output tube 160, a frequency modulation detector tube 161, a sync separator tube 162, a vertical discharge and keyed AGC tube 163, a vertical output tube 164, a horizontal AFC tube 165, and a horizontal multivibrator tube 166. All of these components are mounted on the printed conductor board 54 along with condensers and other elements which appropriately require such disposition.

While we have shown our invention in a preferred embodiment, it will be obvious to those skilled in the art that it is not so limited but is susceptible of various other changes and modifications without departing from the spirit and scope thereof.

We claim as our invention:

In a television receiver, the combination comprising, a chassis for supporting a television picture tube comprising a rear member, side members and a pair of spaced front members, said front members serving as support means for said tube, holding means comprising a strap over the forward edge of said tube adjustably fastened at one end to one of said front members and adjustably fastened at the other end to the other of said front members, a pair of brace members each of which are adjustably fastened at one end to said holding means at the top of said tube and which are fixed at their other end to said rear member of said chassis, a control panel positioned adjacent to the top of said picture tube carrying control elements for said receiver, each of said control elements having a control shaft projecting through an aperture in said control panel, a pair of flexible straps connecting said control panel and said pair of brace members, and a tuner adjustably fixed to one of said brace members and having a control shaft projecting through another aperture in said control panel.

References Cited in the file of this patent

UNITED STATES PATENTS

| | | |
|---|---|---|
| 2,484,345 | Hinz | Oct. 11, 1949 |
| 2,505,736 | Herscher | Apr. 25, 1950 |
| 2,551,790 | Davis | May 8, 1951 |
| 2,796,601 | Gustafson | June 18, 1957 |

FOREIGN PATENTS

| | | |
|---|---|---|
| 144,558 | Australia | Sept. 9, 1948 |
| 644,009 | Great Britain | Oct. 4, 1950 |

OTHER REFERENCES

Electronic Design, May 1954, pages 18, 19.

Radio and TV News, January 1955, page 66.

Rider TV Manual, 1955, vol. 16, Westinghouse, pages 16–35.

Rider TV Manual, 1955, vol. 16, General Electric, pages 16–15.